(12) United States Patent
Kim et al.

(10) Patent No.: US 12,180,342 B2
(45) Date of Patent: *Dec. 31, 2024

(54) POLYMERIZABLE COMPOSITION

(71) Applicant: LG Chem, Ltd., Seoul (KR)

(72) Inventors: Sang Woo Kim, Daejeon (KR); Seung Hee Lee, Daejeon (KR); Ki Ho Ahn, Daejeon (KR)

(73) Assignee: LG Chem, Ltd., Seoul (KR)

( * ) Notice: Subject to any disclaimer, the term of this patent is extended or adjusted under 35 U.S.C. 154(b) by 295 days.

This patent is subject to a terminal disclaimer.

(21) Appl. No.: 15/779,991

(22) PCT Filed: Dec. 2, 2016

(86) PCT No.: PCT/KR2016/014087

§ 371 (c)(1),
(2) Date: May 30, 2018

(87) PCT Pub. No.: WO2017/095174

PCT Pub. Date: Jun. 8, 2017

(65) Prior Publication Data

US 2018/0346646 A1      Dec. 6, 2018

(30) Foreign Application Priority Data

Dec. 4, 2015   (KR) .................. 10-2015-0172376

(51) Int. Cl.
*C08G 73/16*    (2006.01)
*C08G 73/10*    (2006.01)
(Continued)

(52) U.S. Cl.
CPC ......... *C08G 73/16* (2013.01); *C08G 73/1007* (2013.01); *C08G 73/1053* (2013.01);
(Continued)

(58) Field of Classification Search
None
See application file for complete search history.

(56) References Cited

U.S. PATENT DOCUMENTS 4,058,505 A      11/1977   D'Alelio
4,277,583 A  *   7/1981   Waitkus .................. C08L 63/00
                                                   525/423

(Continued)

FOREIGN PATENT DOCUMENTS

CN       101880389 A       11/2010
EP         0319008 A2  *    6/1989    .......... C08L 2666/02

(Continued)

OTHER PUBLICATIONS

Search report from International Application No. PCT/KR2016/014087, mailed Mar. 8, 2017.

(Continued)

*Primary Examiner* — Rachel Kahn
(74) *Attorney, Agent, or Firm* — Lerner David LLP

(57) ABSTRACT

The present application relates to a polymerizable composition, a prepolymer, a phthalonitrile resin, a composite, a process for preparing the same, and a use thereof. The present application can provide a polymerizable composition comprising a curing agent which has excellent heat resistance and does not cause defects such as voids that may adversely affect physical properties. In addition, the present application allows for the polymerizable composition to exhibit appropriate curing properties, processing temperatures and process windows and to be capable of forming a composite of excellent physical properties. The present application can provide a resin having both advantages of a phthalonitrile resin and a polyimide by curing a phthalonitrile compound as a raw material monomer with a curing agent having a polyimide structure.

13 Claims, 4 Drawing Sheets

(51) Int. Cl.
  *C08K 3/04* (2006.01)
  *C08K 3/22* (2006.01)
  *C08K 3/28* (2006.01)
  *C08K 3/40* (2006.01)
  *C08G 69/38* (2006.01)

(52) U.S. Cl.
  CPC ............ *C08G 73/1071* (2013.01); *C08K 3/40* (2013.01); *C08G 69/38* (2013.01); *C08G 73/105* (2013.01); *C08K 3/04* (2013.01); *C08K 3/22* (2013.01); *C08K 3/28* (2013.01)

(56) References Cited

U.S. PATENT DOCUMENTS

| | | | |
|---|---|---|---|
| 4,400,490 A * | 8/1983 | Yang | C08G 69/18 264/240 |
| 4,408,035 A | 10/1983 | Keller | |
| 4,619,986 A * | 10/1986 | Keller | C07C 255/00 528/362 |
| 4,705,833 A * | 11/1987 | Saito | C08G 59/4042 525/423 |
| 4,985,529 A * | 1/1991 | Saito | C08G 73/10 528/96 |
| 5,003,039 A | 3/1991 | Keller | |
| 5,003,078 A | 3/1991 | Keller | |
| 5,004,801 A | 4/1991 | Keller et al. | |
| 5,132,396 A | 7/1992 | Keller | |
| 5,139,054 A | 8/1992 | Long et al. | |
| 5,208,318 A | 5/1993 | Keller | |
| 5,237,045 A | 8/1993 | Burchill et al. | |
| 5,292,854 A | 3/1994 | Keller | |
| 5,304,625 A | 4/1994 | Keller | |
| 5,350,828 A | 9/1994 | Keller et al. | |
| 5,925,475 A | 7/1999 | Sastri et al. | |
| 6,001,926 A | 12/1999 | Sastri et al. | |
| 6,187,874 B1 * | 2/2001 | Yoshioka | C09J 163/00 525/423 |
| 2007/0074896 A1 * | 4/2007 | Tanaka | B32B 27/281 174/259 |

FOREIGN PATENT DOCUMENTS

| | | | |
|---|---|---|---|
| IN | 201002922-11 | * | 8/2013 |
| KR | 20010024393 A | | 3/2001 |
| KR | 100558158 B1 | | 3/2006 |
| WO | 02079301 A2 | | 10/2002 |

OTHER PUBLICATIONS

Extended European Search Report for Application No. EP16871070.5 dated Nov. 13, 2018.

Satya B. Sastri et al., "Phthalonitrile Cure Reaction With Aromatic Diamines", Journal of Polymer Science, Accepted Feb. 5, 1998, vol. 36, No. 11, pp. 1885-1890, XP55520875.

* cited by examiner

POLYMERIZABLE COMPOSITION

CROSS-REFERENCE TO RELATED APPLICATIONS

The present application is a national phase entry under 35 U.S.C. § 371 of International Application No. PCT/KR2016/014087 filed Dec. 2, 2016, which claims priority from Korean Patent Application No. 10-2015-0172376 filed on Dec. 4, 2015, the disclosures of which are incorporated herein by reference.

TECHNICAL FIELD

The present application relates to a polymerizable composition, a prepolymer, a phthalonitrile resin, a composite, a process for preparing the same, and a use thereof.

BACKGROUND ART

The phthalonitrile resin can be used in various applications. For example, a composite formed by impregnating a filler such as glass fiber or carbon fiber with the phthalonitrile resin can be used as a material for automobiles, airplanes, ships, and the like. The process for producing the composite may include, for example, a process of mixing a mixture of phthalonitrile and a curing agent or a prepolymer formed by reaction of the mixture with a filler and then curing the mixture (see, for example, Patent Document 1).

In order to effectively perform the process for producing the composite, it is required that phthalonitrile, which is a monomer, or a polymerizable composition or prepolymer formed therefrom has appropriate fusibility and fluidity, and a so-called process window is wide.

Furthermore, when the mixture of phthalonitrile and a curing agent or the prepolymer includes voids or causes voids in the processing or curing process, physical properties of the composite may be deteriorated, and thus such a problem must be also considered.

(Patent Document 1) Korean Patent No. 0558158

DISCLOSURE

Technical Problem

The present application provides a polymerizable composition, a prepolymer, a resin, a composite, a process for preparing the same, and a use thereof. It is one object of the present application to provide a polymerizable composition comprising a curing agent which has excellent heat resistance and does not cause defects such as voids that may adversely affect physical properties. In addition, it is another object of the present application that the polymerizable composition exhibits appropriate curing properties, processing temperatures and process windows and is capable of forming a composite of excellent physical properties. It is another object of the present application to provide a resin having both advantages of a phthalonitrile resin and a polyimide by curing a phthalonitrile compound as a raw material monomer with a curing agent having a polyimide structure.

Technical Solution

The present application relates to a polymerizable composition. In one example, the polymerizable composition may be a composition capable of forming a so-called phthalonitrile resin through a polymerization reaction.

The polymerizable composition may comprise a phthalonitrile compound and a curing agent.

The kind of the phthalonitrile compound usable in the polymerizable composition is not particularly limited, and for example, a compound comprising 2 or more, 2 to 20, 2 to 16, 2 to 12, 2 to 8, or 2 to 4 phthalonitrile structures which are capable of forming a phthalonitrile resin through reaction with a curing agent, can be used. There are various compounds known to be suitable for forming the phthalonitrile resin, and in the present application, all of the above known compounds can be used. In one example, as examples of the compounds, those known in U.S. Pat. Nos. 4,408,035, 5,003,039, 5,003,078, 5,004,801, 5,132,396, 5,139,054, 5,208,318, 5,237,045, 5,292,854 or U.S. Pat. No. 5,350,828 can be exemplified, and various compounds known in the art, besides those mentioned by above documents, can be included in the examples.

The polymerizable composition may further comprise a curing agent, and as the curing agent, a compound represented by Formula 1 below may be used. The curing agent of Formula 1 contains a polyimide structure in the molecular structure, thereby exhibiting excellent heat resistance, and may form a polymerizable composition which does not generate voids or the like that may adversely affect physical properties, even when an excess amount of the curing agent is contained in the polymerizable composition or the polymerizable composition is processed or cured at a high temperature. In addition, there is an additional advantage of forming a resin having both advantages of a phthalonitrile resin and a polyimide depending on the ratio of the curing agent of Formula 1 and the like.

[Formula 1]

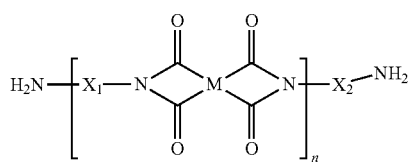

In Formula 1, M is a tetravalent radical, $X_1$ and $X_2$ are each independently an alkylene group, an alkylidene group or an aromatic divalent radical, and n is a number of 2 or more. In another example, n in Formula 1 may be in a range of 2 to 200, 2 to 150, 2 to 100, 2 to 90, 2 to 80, 2 to 70, 2 to 60, 2 to 50, 2 to 40, 2 to 30, 2 to 20, or 2 to 10 or so.

In the present application, the term n-valent radical (where n is any number) may mean an n-valent residue derived from a predetermined compound, unless otherwise specified. For example, in Formula 1 above, M may be a tetravalent radical derived from an aliphatic, alicyclic or aromatic compound. In this case, M may have a structure in which radicals formed by leaving four hydrogen atoms from the aliphatic, alicyclic or aromatic compound are linked with carbon atoms of carbonyl groups of Formula 1, respectively.

In addition, $X_1$ and $X_2$ in Formula 1 may be each an aromatic divalent radical, and in this case, $X_1$ and $X_2$ may have a structure in which radicals formed by leaving two hydrogen atoms from an aromatic compound are linked with nitrogen atoms of Formula 1, respectively. In this specification, an aromatic divalent radical may also be referred to as an arylene group in another term, and an aromatic monovalent radical may be referred to as an aryl group in another term.

Here, as the aliphatic compound, linear or branched alkane, alkene or alkyne may be exemplified. As the aliphatic compound, an alkane, alkene or alkyne having 2 to 20 carbon atoms, 2 to 16 carbon atoms, 2 to 12 carbon atoms, 2 to 8 carbon atoms or 2 to 4 carbon atoms may be used. The alkane, alkene or alkyne may be optionally substituted by one or more substituents.

Here, as the alicyclic compound, a hydrocarbon compound comprising a non-aromatic ring structure having 3 to 20 carbon atoms, 3 to 16 carbon atoms, 3 to 12 carbon atoms, 3 to 8 carbon atoms, or 3 to 4 carbon atoms may be exemplified. Such an alicyclic hydrocarbon compound may also contain at least one heteroatom such as oxygen or nitrogen as a ring constituent atom, and may optionally be substituted with one or more substituents, if necessary.

In addition, the aromatic compound in the above may be exemplified by benzene, a benzene-containing compound or a derivative of any one of the foregoing. Here, the benzene-containing compound may mean a compound having a structure in which two or more benzene rings are condensed while sharing one or two carbon atoms or directly linked or a structure in which they are linked by an appropriate linker. Here, as the linker applied to link two benzene rings, an alkylene group, an alkylidene group, an oxygen atom, a sulfur atom, a carbonyl group, —$NR_{11}$—, —$S(=O)$—, —$S(=O)_2$—, —$C(=O)$—$O$-$L_1$-$O$—$C(=O)$—, -$L_2$-$C(=O)$—$O$-$L_3$-, -$L_4$-$O$—$C(=O)$-$L_5$- or -$L_6$-$Ar_1$-$L_7$-$Ar_2$-$L_8$- and the like may be exemplified. In the above, $L_1$ to $L_8$ may be each independently a single bond, an oxygen atom, an alkylene group or an alkylidene group, $Ar_1$ and $Ar_2$ may be each independently an arylene group, and $R_{11}$ may be hydrogen, an alkyl group, an alkoxy group or an aryl group.

The aromatic compound may comprise, for example, 6 to 30, 6 to 28, 6 to 27, 6 to 25, 6 to 20 or 6 to 12 carbon atoms, and may be substituted by one or more substituents, if necessary. In the above, the number of carbon atoms in the aromatic compound is also the number including carbon atoms present in the linker, when the compound includes the linker described above.

In one example, the alicyclic or aromatic compound forming the tetravalent radical may be exemplified by a compound represented by any one of Formulas 2 to 7 below.

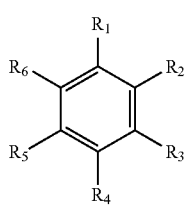

[Formula 2]

In Formula 2 above, $R_1$ to $R_6$ are each independently hydrogen, an alkyl group, an alkoxy group or an aryl group.

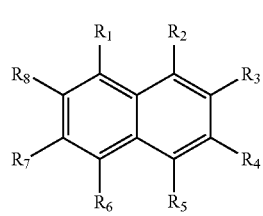

[Formula 3]

In Formula 3, $R_1$ to $R_8$ are each independently hydrogen, an alkyl group, an alkoxy group or an aryl group.

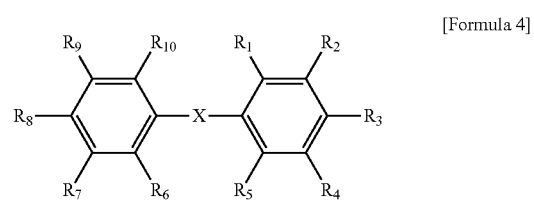

[Formula 4]

In Formula 4, $R_1$ to $R_{10}$ are each independently hydrogen, an alkyl group, an alkoxy group or an aryl group, X is a single bond, an alkylene group, an alkylidene group, an oxygen atom, a sulfur atom, a carbonyl group, —$S(=O)$—, —$S(=O)_2$—, —$C(=O)$—$O$-$L_1$-$O$—$C(=O)$—, -$L_2$-$C(=O)$—$O$-$L_3$-, -$L_4$-$O$—$C(=O)$-$L_5$- or -$L_6$-$Ar_1$-$L_7$-$Ar_2$-$L_8$-, where $L_1$ to $L_8$ are each independently a single bond, an oxygen atom, an alkylene group or an alkylidene group and $Ar_1$ and $Ar_2$ are each independently an arylene group.

In this specification, the term single bond means the case where no atom is present at that part. Accordingly, when X is a single bond in Formula 5 above, there is no atom in the part represented by X, and in this case, benzene rings on both sides of X may be directly connected to form a biphenyl structure.

In —$C(=O)$—$O$-$L_1$-$O$—$C(=O)$—, -$L_2$-$C(=O)$—$O$-$L_3$- or -$L_4$-$O$—$C(=O)$-$L_5$-among the X of Formula 4, $L_1$ to $L_5$ may be each independently an alkylene group or an alkylidene group, having 1 to 12 carbon atoms, 1 to 8 carbon atoms, or 1 to 4 carbon atoms, and the alkylene group or the alkylidene group may be substituted or unsubstituted.

Furthermore, in -$L_6$-$Ar_1$-$L_7$-$Ar_2$-$L_8$-among X of Formula 4, $L_6$ and $L_8$ may be an oxygen atom, $L_7$ may be an alkylene group or an alkylidene group, having 1 to 12 carbon atoms, 1 to 8 carbon atoms, or 1 to 4 carbon atoms, and the alkylene group or the alkylidene group may be substituted or unsubstituted. On the other hand, in the above, $Ar_1$ and $Ar_2$ may be a phenylene group, and in this case, the $L_6$ and $L_8$ may be each linked to ortho, meta or para position of the phenylene, based on $L_7$.

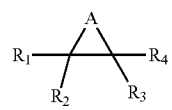

[Formula 5]

In Formula 5, $R_1$ to $R_4$ are each independently hydrogen, an alkyl group or an alkoxy group, and A is an alkylene group or an alkenylene group. In Formula 6, two of $R_1$ to $R_4$ may be also linked to each other to form an alkylene group, and the alkylene group or alkenylene group of A may contain one or more oxygen atoms as a hetero atom.

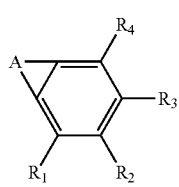

[Formula 6]

In Formula 6, $R_1$ to $R_4$ are each independently hydrogen, an alkyl group or an alkoxy group, and A is an alkylene group.

[Formula 7]

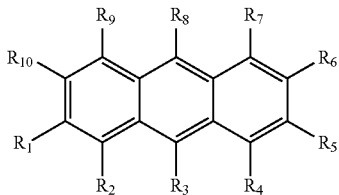

In Formula 7, $R_1$ to $R_{10}$ are each independently hydrogen, an alkyl group or an alkoxy group.

In the present application, the term alkyl group may be an alkyl group having 1 to 20 carbon atoms, 1 to 16 carbon atoms, 1 to 12 carbon atoms, 1 to 8 carbon atoms or 1 to 4 carbon atoms, unless otherwise specified. The alkyl group may be linear, branched or cyclic and, if necessary, may be substituted by one or more substituents.

In the present application, the term alkoxy group may be an alkoxy group having 1 to 20 carbon atoms, 1 to 16 carbon atoms, 1 to 12 carbon atoms, 1 to 8 carbon atoms or 1 to 4 carbon atoms, unless otherwise specified. The alkoxy group may be linear, branched or cyclic, and, if necessary, may be substituted by one or more substituents.

In the present application, the term aryl group may mean a monovalent residue derived from the above-mentioned aromatic compound, unless otherwise specified.

In the present application, the term alkylene group or alkylidene group may mean an alkylene group or an alkylidene group, having 1 to 20 carbon atoms, 1 to 16 carbon atoms, 1 to 12 carbon atoms, 1 to 8 carbon atoms or 1 to 4 carbon atoms, unless otherwise specified. The alkylene group or alkylidene group may be linear, branched or cyclic. In addition, the alkylene or alkylidene group may be optionally substituted with one or more substituents.

As the substituent optionally substituted in the aliphatic compound, alicyclic compound, aromatic compound, alkyl group, alkoxy group, aryl group, alkylene group or alkylidene group, and the like in the present application, halogen such as chlorine or fluorine, an epoxy group such as a glycidyl group, an epoxyalkyl group, a glycidoxyalkyl group or an alicyclicepoxy group, a acryloyl group, a methacryloyl group, an isocyanate group, a thiol group, an alkyl group, an alkoxy group or an aryl group, and the like may be exemplified, without being limited thereto.

Here, as the compound of Formula 2, benzene or 1,2,4,5-tetraalkylbenzene and the like may be exemplified, without being not limited thereto.

In addition, as the compound of Formula 4, biphenyl or a compound represented by any one of Formulas A to F may be exemplified, without being limited thereto. For example, a compound in which X of Formula 4 is —C(=O)—O—L1—O—C(=O)—, -L$_2$-C(=O)—O-L$_3$- or -L$_4$-O—C(=O)-L$_5$-, where $L_1$ to $L_5$ may be each independently an alkylene group or an alkylidene group, having 1 to 12 carbon atoms, 1 to 8 carbon atoms or 1 to 4 carbon atoms and the alkylene or alkylidene group may be substituted or unsubstituted, or a compound in which in Formula 4, X is-L$_6$-Ar$_1$-L$_7$-Ar$_2$-L$_8$-, where $L_6$ and $L_8$ are an oxygen atom, $L_7$ is an alkylene group or an alkylidene group, having 1 to 12 carbon atoms, 1 to 8 carbon atoms or 1 to 4 carbon atoms, the alkylene group or alkylidene group may be substituted or unsubstituted, and $Ar_1$ and $Ar_2$ are a phenylene group, may be also used. In the above, the $L_6$ and $L_8$ may be each linked to ortho, meta or para position of the phenylene, based on $L_7$.

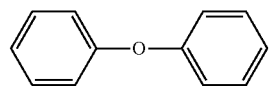
[Formula A]

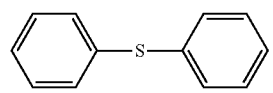
[Formula B]

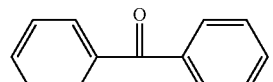
[Formula C]

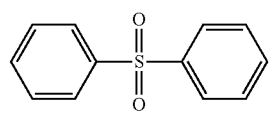
[Formula D]

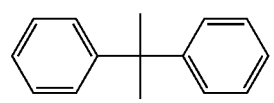
[Formula E]

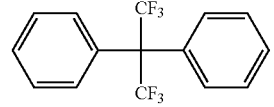
[Formula F]

Furthermore, as the compound of Formula 5, a cycloalkane having 4 to 8 carbon atoms or a cyclohexene which may be substituted with at least one alkyl group, and the like, or a compound represented by any one of Formulas G to I may be exemplified, without being limited thereto.

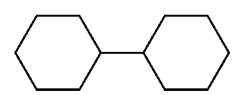
[Formula G]

[Formula H]

[Formula I]

Here, as the compound of Formula 6, a compound represented by Formula J, which may be substituted with one or more alkyl groups, may be exemplified, without being limited thereto.

[Formula J]

For example, radicals are formed by leaving four hydrogen atoms from the above compounds, and the radicals may be included in the structure of Formula 1.

These radicals may be formed by direct elimination of the substituents $R_1$ to $R_{10}$ of Formulas 2 to 7, or also formed by leaving hydrogen atoms belonging to an alkyl group, alkoxy group, aryl group, alkylene group or alkenylene group which is a substituent capable of being present in $R_1$ to $R_{10}$.

For example, when the radicals are derived from the compound of Formula 3, one or more, two or more, three or more, or four of $R_1$ to $R_6$ of Formula 3 may form radicals, or the radicals may be formed by leaving hydrogen atoms of the alkyl group, alkoxy group or aryl group present in the $R_1$ to $R_6$. Here, the formation of radicals may mean that the moieties are linked to carbon atoms of carbonyl groups of Formula 1, as described above.

The tetravalent radical of Formula 1 may be a tetravalent radical derived from the compound of Formula 4. In this case, although $R_1$ to $R_{10}$ of Formula 4 are each independently hydrogen, an alkyl group, an alkoxy group, or an aryl group, four or more of $R_1$ to $R_{10}$ may form radicals linked to Formula 1. Here, each of those forming no radical may be hydrogen, an alkyl group or an alkoxy group, or hydrogen or an alkyl group. In one example, any two of $R_7$ to $R_9$ and any two of $R_2$ to $R_4$ in Formula 4 may form the radicals, and the other substituents may be each independently hydrogen, an alkyl group, an alkoxy group or an aryl group, or hydrogen, an alkyl group or an alkoxy group, or hydrogen or an alkyl group.

In Formula 1, $X_1$ and $X_2$ are each independently an alkylene group, an alkylidene group or an aromatic divalent radical, and in another example, they may be the same or different aromatic divalent radicals. Here, the aromatic divalent radical may be a divalent radical derived from the above-mentioned aromatic compound.

In one example, $X_1$ and $X_2$ of Formula 1 above may be each independently a divalent radical derived from a compound represented by any one of Formulas 8 to 10 below.

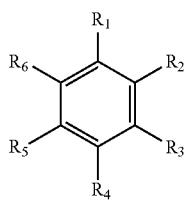
[Formula 8]

In Formula 8, $R_1$ to $R_6$ are each independently hydrogen, an alkyl group, an alkoxy group, an aryl group, a hydroxy group or a carboxyl group.

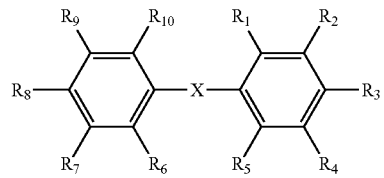
[Formula 9]

In Formula 9, $R_1$ to $R_{10}$ are each independently hydrogen, an alkyl group, an alkoxy group, a hydroxy group, a carboxyl group or an aryl group and X is a single bond, an alkylene group, an alkylidene group, an oxygen atom, a sulfur atom, a carbonyl group, —$NR_{11}$—, —$S(=O)$—, —$S(=O)_2$—, -$L_9$-$Ar_3$-$L_{10}$- or -$L_9$-$Ar_3$-$L_{10}$-$Ar_4$-$L_{11}$-, where $R_{11}$ is hydrogen, an alkyl group, an alkoxy group or an aryl group, $Ar_3$ and $Ar_4$ are an arylene group, and $L_9$ to $L_{11}$ are each independently a single bond, an oxygen atom, an alkylene group or an alkylidene group.

Here, the meaning of the single bond is as defined above.

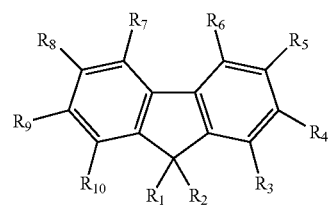
[Formula 10]

In Formula 10, $R_1$ to $R_{10}$ are each independently hydrogen, an alkyl group, an alkoxy group, a hydroxy group, a carboxyl group or an aryl group.

As the compound of Formula 8, benzene which may be substituted with at least one hydroxyl group or carboxyl group may be exemplified, without being limited thereto.

In addition, as the compound of Formula 9, biphenyl which may be substituted with at least one hydroxy group or carboxyl group or a compound which is represented by any one of Formulas A to F above and may be substituted with at least one hydroxyl group or a carboxyl group or a compound which is represented by Formula K or L below and may be substituted with at least one hydroxy group or carboxyl group may be exemplified, without being limited thereto.

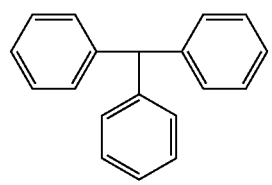
[Formula K]

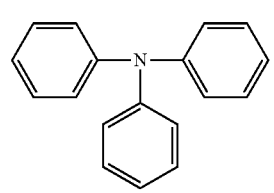
[Formula L]

As the compound of Formula 10, a compound which is represented by Formula M below and may be substituted with at least one hydroxy group or carboxyl group may be exemplified, without being limited thereto.

[Formula M]

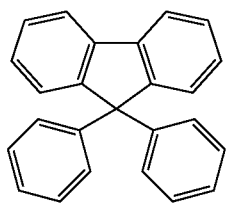

In one example, the aromatic divalent radical may be a radical derived from the compound of Formula 8 or 9 above, and an example thereof may include phenylene, but is not limited thereto. When the divalent radical is phenylene, the substitution position of one amine group may be ortho, meta or para position based on the moiety linked to N in $X_1$ of Formula 1, and the substitution position of one amine group may be also ortho, meta or para position based on the moiety linked to N in $X_2$ of Formula 1.

In addition, when $X_1$ or $X_2$ in Formula 1 is a radical derived from the compound of Formula 9, a radical may be formed, in which any one of $R_7$ to $R_9$ in Formula 9 and any one of $R_2$ to $R_4$ in Formula 9 are linked to the nitrogen atom of Formula 1.

Other substituents except for the radical-forming substituent may be each independently hydrogen, an alkyl group, an alkoxy group or an aryl group, or hydrogen, an alkyl group or an alkoxy group, or hydrogen or an alkyl group.

The compound of Formula 1 can be synthesized according to synthesis methods of known organic compounds, and the specific method thereof is not particularly limited. For example, the compound of Formula 1 can be formed by dehydration and condensation reactions of a dianhydride compound and a diamine compound, and the like.

The compound of Formula 1 has a high boiling point and is not volatilized or decomposed at a high temperature, thereby forming no void capable of adversely affecting physical properties of the composite in processing or curing processes, while stably maintaining the curing property of the polymerizable composition. Accordingly, in one example, the compound may have a decomposition temperature of 300° C. or higher, 350° C. or higher, 400° C. or higher, or 500° C. or higher. In the present application, the term decomposition temperature may mean a temperature at which the decomposition rate of the compound of Formula 1 is maintained in the range of 10% or less, 5% or less, or 1% or less. The upper limit of the decomposition temperature is not particularly limited and may be, for example, about 1,000° C. or less.

The compound of the Formula 1 can easily adjust the process window of the reactant or the polymerizable composition itself, that is, the difference between the melting temperature and the curing temperature of the the polymerizable composition or the prepolymer formed therefrom, by selecting M of the core or $X_1$ or $X_2$ as the linker, and thus can act as a curing agent having various physical properties depending on applications.

The ratio of the curing agent in the polymerizable composition is not particularly limited. The above ratio can be adjusted so that the desired curability can be ensured in consideration of, for example, the ratio or kind of the curable component such as the phthalonitrile compound contained in the composition. For example, the curing agent may be included in about 0.02 to 1.5 moles per mole of the phthalonitrile compound contained in the polymerizable composition. However, the above ratio is only an example of the present application. Usually, the process window tends to become narrow if the ratio of the curing agent in the polymerizable composition is high, while the curing property tends to become insufficient if the ratio of the curing agent is low, so that the suitable ratio of the curing agent can be selected in consideration of these points, and the like.

The polymerizable composition of the present application exhibits proper curing property, melting temperature and process window through using the compound of Formula 1, and it is possible to provide a polymerizable composition and a prepolymer capable of forming a composite having excellent physical properties without deterioration of physical properties due to voids, and the like.

Thus, in one example, the processing temperature of the polymerizable composition may be in the range of 150° C. to 350° C. In the present application, the term processing temperature may mean a temperature at which the compound, the following polymerizable composition or prepolymer containing it, etc. is present in a processable state. Such a processing temperature may be, for example, a melting temperature (Tm) or a glass transition temperature (Tg). In this case, the process window of the polymerizable composition, that is, the absolute value of the difference (Tc-Tp) between the processing temperature (Tp) and the curing temperature (Tc) of the phthalonitrile compound and the compound of Formula 1, may be 30° C. or higher, 50° C. or higher, or 100° C. or higher. In one example, the curing temperature (Tc) may be higher than the processing temperature (Tp). Such a range may be advantageous, for example, for securing proper processability in the process of producing a composite to be described below by using a polymerizable composition. The upper limit of the process window is not particularly limited, but for example, the absolute value of the difference (Tc–Tp) between the processing temperature (Tp) and the curing temperature (Tc) may be 400° C. or lower or 300° C. or lower.

The polymerizable composition may further comprise various additives. As an example of such an additive, various fillers may be exemplified. The kind of the material that can be used as the filler is not particularly limited, and any known filler suitable for the intended use may be used. Exemplary fillers include, but are not limited to, a metal material, a ceramic material, glass, a metal oxide, a metal nitride or a carbon-based material. In addition, the form of the filler is also not particularly limited and may be various forms, such as fibrous materials such as aramid fibers, glass fibers, carbon fibers or ceramic fibers, or woven fabrics, nonwoven fabrics, cords or strings, formed by the material, particles containing nanoparticles, polygons or other amorphous forms. As an example of the carbon-based material, graphite, graphene, or carbon nanotubes, and the like, or derivatives or isomers such as their oxides, and the like may be exemplified.

In the polymerizable composition, various monomers known to be applicable to the production of so-called engineering plastics such as polyimide, polyamide, polystyrene and the like, as well as the above filler, or other additives may be included without limitation depending on the purpose.

The present application also relates to a prepolymer formed by the reaction of the polymerizable composition, that is, the polymerizable composition comprising the phthalonitrile compound and the compound of Formula 1.

In the present application, the term prepolymer state may mean a state in which the reaction of the phthalonitrile compound with the compound of the Formula 1 occurs in the polymerizable composition to some extent (for example, a stage in which the polymerization of a so-called A or B stage step occurs), or a state which does not reach the fully polymerized state and exhibits appropriate fluidity, and thus, for example, is possible to process the composite, as described below. In one example, the prepolymer state may mean a state in which the polymerization of the polymerizable composition proceeds to some extent and for which a melt viscosity measured at a temperature in the range of about 150° C. to 250° C. is 100 cP to 50,000 cP, 100 cP to 10,000 cP or 100 cP to 5000 cP.

The prepolymer may also exhibit excellent curing property, a low melting temperature and a wide process window.

For example, the processing temperature of the prepolymer may be in the range of 150° C. to 350° C. In this case, the process window of the prepolymer, that is, the absolute value of the difference (Tc-Tp) between the processing temperature (Tp) and the curing temperature (Tc) may be 30° C. or higher, 50° C. or higher, or 100° C. or higher. In one example, the curing temperature (Tc) may be higher than the processing temperature (Tp). Such a range may be advantageous, for example, for securing proper processability in the process of producing a composite to be described below by using a polymerizable composition. The upper limit of the process window is not particularly limited, but for example, the absolute value of the difference (Tc-Tp) between the processing temperature (Tp) and the curing temperature (Tc) may be 400° C. or lower or 300° C. or lower.

The prepolymer may further comprise any known additives in addition to the above components. As an example of such an additive, the above-mentioned fillers and the like may be exemplified, without being limited thereto.

The present application also relates to a phthalonitrile resin which is a polymer of said polymerizable composition. Such a resin can be formed, for example, by polymerizing the above-described polymerizable composition or prepolymer.

The present application also relates to a composite. The composite may comprise the above-described phthalonitrile resin and the filler. As described above, if the polymerizable composition of the present application is used, it is possible to achieve appropriate curing property, melt temperature and process window, and to prevent voids and the like that can adversely affect the physical properties even at high temperatures applied in the process of forming the composite or the resin, whereby a so-called reinforced polymer composite having excellent physical properties can be easily formed. The composite thus formed may comprise the phthalonitrile resin and the filler, and may be applied to various applications including durables for automobiles, airplanes, ships, and the like.

The kind of the filler is not particularly limited and may be suitably selected in consideration of the intended use. As the usable filler, a fibrous material such as carbon fibers, aramid fibers, glass fibers or ceramic fibers, or woven fabrics, non-woven fabrics, cords or strings, formed by the material, or carbon nanomaterials such as carbon nanotubes or graphene, and the like may be exemplified, without being limited thereto.

The ratio of the filler is not particularly limited, and may be set in an appropriate range according to the intended use.

The present application also relates to a precursor for preparing the composite, wherein the precursor may comprise, for example, the polymerizable composition described above and the filler, or the prepolymer described above and the filler.

The composite can be prepared in a known manner using the precursor. For example, the composite can be formed by curing the precursor.

In one example, the precursor may be prepared by blending the polymerizable composition or the prepolymer, which is prepared by compounding a phthalonitrile compound with the compound of Formula 1 in a molten state, with the filler in a state molten by heating or the like. For example, the above-described composite may be prepared by molding the precursor produced as above into a desired shape and then curing it. A method of forming a prepolymer or the like in the above process, a process for preparing a composite by compounding such a prepolymer and the like with a filler, and processing and curing it may be carried out according to a known method.

Advantageous Effects

The present application can provide a polymerizable composition comprising a curing agent which has excellent heat resistance and does not cause defects such as voids that may adversely affect physical properties. In addition, the present application allows for the polymerizable composition to exhibit appropriate curing properties, processing temperatures and process windows and to be capable of forming a composite of excellent physical properties. The present application can provide a resin having both advantages of a phthalonitrile resin and a polyimide by curing a phthalonitrile compound as a raw material monomer with a curing agent having a polyimide structure.

MODE FOR INVENTION

Hereinafter, the polymerizable composition or the like of the present application will be specifically described by way of Examples and Comparative Examples, but the scope of the polymerizable composition and the like is not limited to the following Examples.

1. NMR (Nuclear Magnetic Resonance) Analysis

The NMR analysis of the compound was performed according to the manufacturer's manual using an Agilent 500 MHz NMR instrument. A sample for measuring NMR was prepared by dissolving a compound in DMSO (dimethyl sulfoxide)-d6.

2. DSC (Differential Scanning Calorimetry) Analysis

The DSC analysis was performed in an N2 flow atmosphere using a Q20 system from TA Instrument with increasing the temperature from 35° C. to 450° C. at a rate of 10° C./min.

3. TGA (Thermogravimetric Analysis) Analysis

The TGA analysis was performed using a TGA e850 instrument from Mettler-Toledo. The TGA analysis was performed in an N2 flow atmosphere with increasing the temperature for the sample from about 25° C. to 800° C. at a rate of 10° C./min.

Production Example 1. Synthesis of Compound (CA1)

Figure 1:
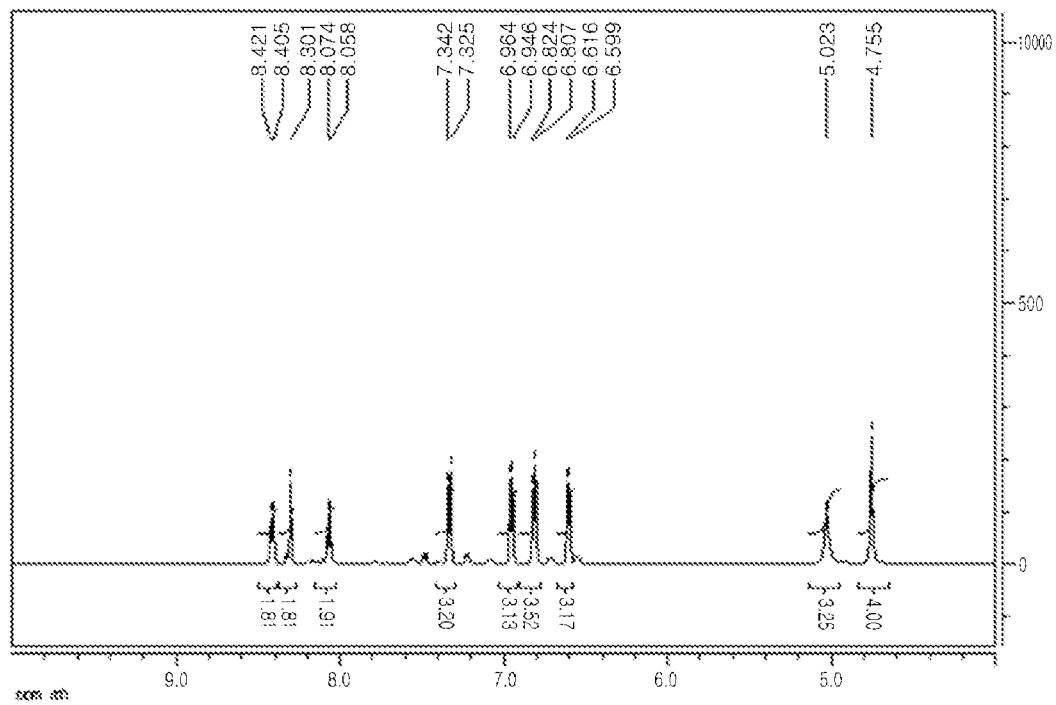
FIGS. 1 to 7 are the NMR measurement results for compounds prepared in Production Examples.

The compound of Formula 14 below was synthesized by dehydration and condensation of a diamine and a dianhydride. 24 g of the compound of Formula 13 (4,4'-oxydianiline) and 60 g of NMP (N-methyl pyrrolidone) were charged into an RBF (3 neck round bottom flask) and dissolved by stirring at room temperature. The above solution was cooled with a water bath, and 12.3 g of the compound of Formula 13 below was divided into three times and slowly added thereto together with 60 g of NMP. When all the added compounds were dissolved, 24 g of toluene was added to the reactant for the azeotrope reaction. A Dean Stark unit and a reflux condenser were installed, and the Dean Stark unit was charged with toluene added. 4.2 mL of pyridine was added as a catalyst for dehydration and condensation, followed by raising the temperature to 170° C. and stirring for 3 hours. The reactant was further stirred for 2 hours while removing water generated as imide rings were formed, with the Dean Stark unit, and the residual toluene and pyridine were removed. The reaction product was cooled to room temperature, precipitated in methanol and recovered. The recovered precipitate was subjected to soxhlet extraction with methanol to remove the residual reactant and dried in a vacuum oven to obtain the compound of Formula 14 in a yield of about 87% by weight. The NMR analysis results of the compound of Formula 14 are shown in FIG. 1.

[Formula 12]

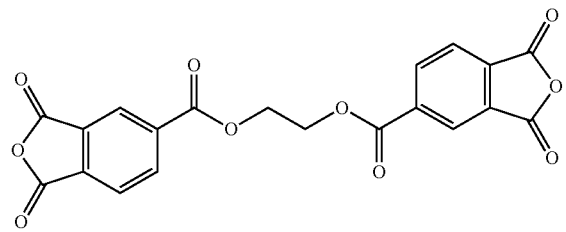

[Formula 13]

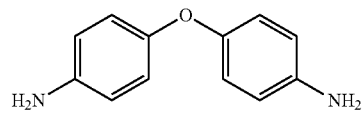

[Formula 14]

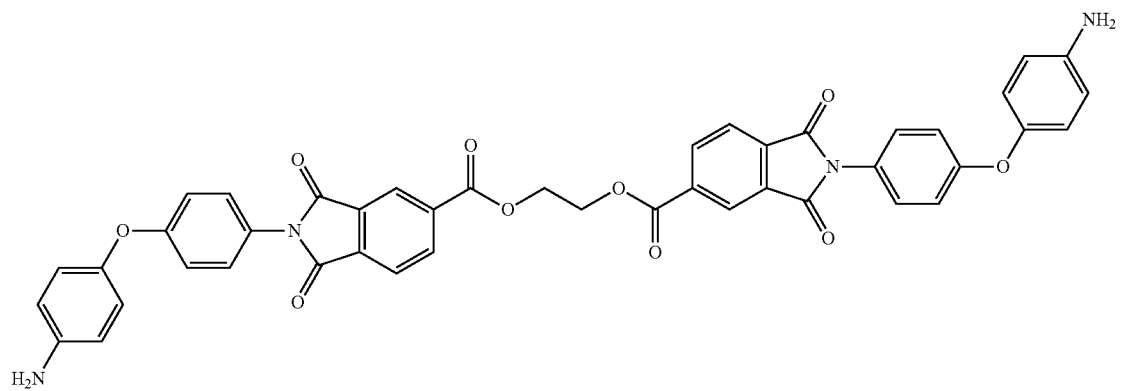

Production Example 2. Synthesis of Compound (CA2)

Figure 2:
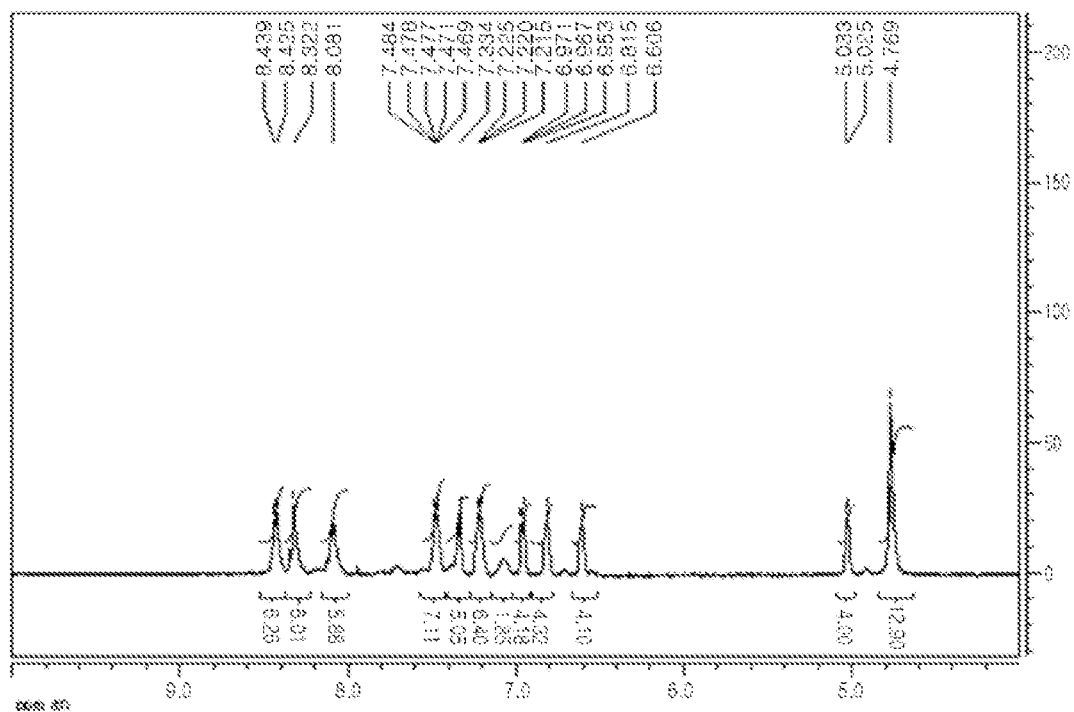

The compound of Formula 15 below was synthesized by dehydration and condensation of a diamine and a dianhydride. 15 g of the compound of Formula 13 (4,4'-oxydianiline) in Production Example 1 and 40 g of NMP (N-methyl pyrrolidone) were added to an RBF (3 neck round bottom flask) and dissolved by stirring at room temperature. The above solution was cooled with a water bath, and 20.5 g of the compound of Formula 13 in Production Example 1 was divided into three times and slowly added thereto together with 30 g of NMP. When all the added compounds were dissolved, 14 g of toluene was added to the reactant for the azeotrope reaction. A Dean Stark unit and a reflux condenser were installed, and the Dean Stark unit was charged with toluene added. 5.2 mL of pyridine was added as a catalyst for dehydration and condensation, followed by raising the temperature to 170° C. and stirring for 3 hours. The reactant was further stirred for 2 hours while removing water generated as imide rings were formed, with the Dean Stark unit, and the residual toluene and pyridine were removed. The reaction product was cooled to room temperature, precipitated in methanol and recovered. The recovered precipitate was subjected to soxhlet extraction with methanol to remove the residual reactant and dried in a vacuum oven to obtain the compound of Formula 15 in a yield of about 92% by weight. The NMR analysis results of the compound of Formula 15 are shown in FIG. 2.

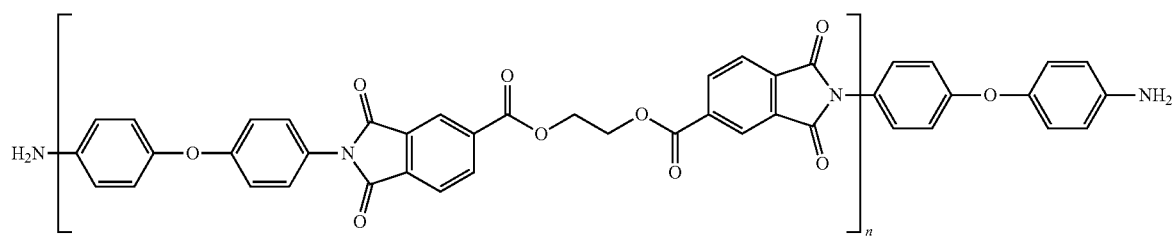

[Formula 15]

In Formula 15, n is about 3.

Production Example 3. Synthesis of Compound (CA3)

Figure 3:
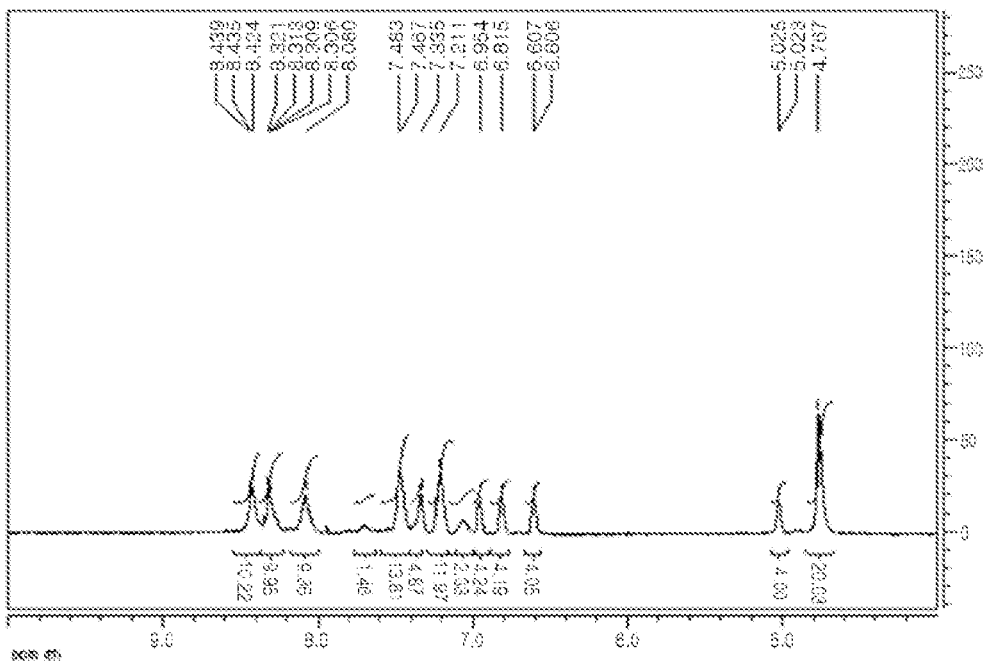

The compound of Formula 16 below was synthesized by dehydration and condensation of a diamine and a dianhydride. 20 g of the compound of Formula 13 (4,4'-oxydianiline) in Production Example 1 and 50 g of NMP (N-methyl pyrrolidone) were added to an RBF (3 neck round bottom flask) and dissolved by stirring at room temperature. The above solution was cooled with a water bath, and 30.7 g of the compound of Formula 13 in Production Example 1 was divided into three times and slowly added thereto together with 50 g of NMP. When all the added compounds were dissolved, 20 g of toluene was added to the reactant for the azeotrope reaction. A Dean Stark unit and a reflux condenser were installed, and the Dean Stark unit was charged with toluene added. 5.2 mL of pyridine was added as a catalyst for dehydration and condensation, followed by raising the temperature to 170° C. and stirring for 3 hours. The reactant was further stirred for 2 hours while removing water generated as imide rings were formed, with the Dean Stark unit, and the residual toluene and pyridine were removed. The reaction product was cooled to room temperature, precipitated in methanol and recovered. The recovered precipitate was subjected to soxhlet extraction with methanol to remove the residual reactant and dried in a vacuum oven to obtain the compound of Formula 16 in a yield of about 88% by weight. The NMR analysis results of the compound of Formula 16 are shown in FIG. 3.

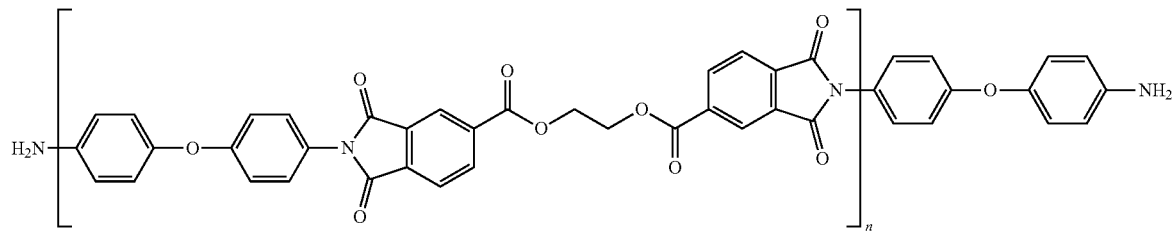

[Formula 16]

In Formula 16, n is about 5.

Production Example 4. Synthesis of Compound (CA4)

Figure 4:
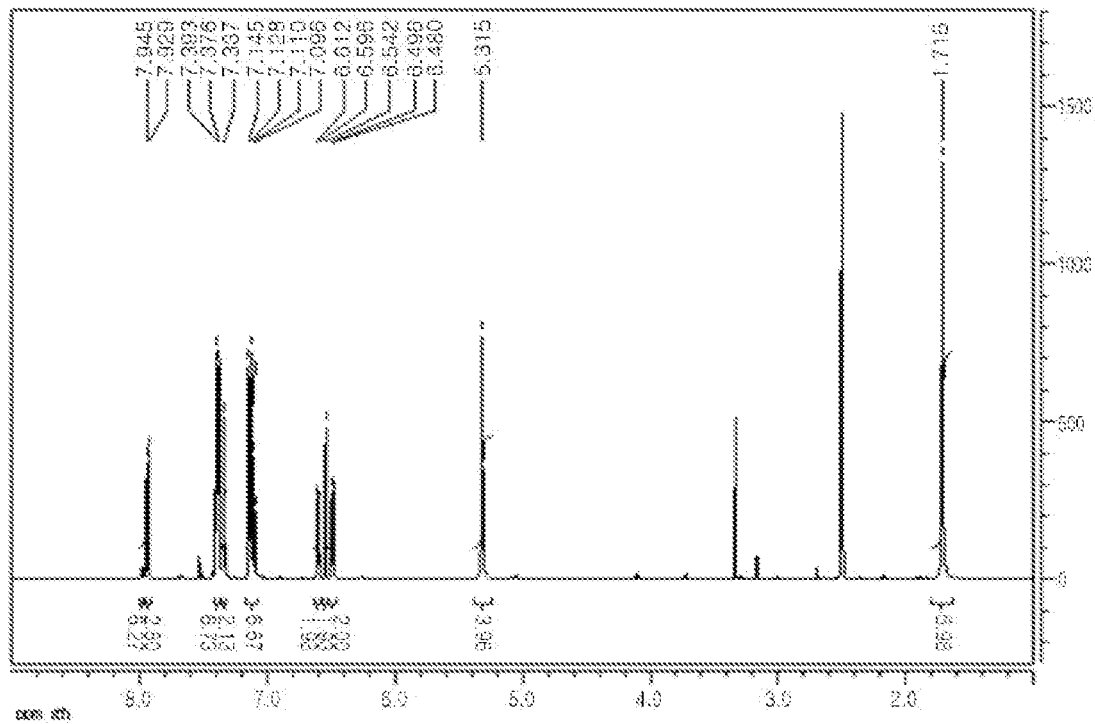

The compound of Formula 19 below was synthesized by dehydration and condensation of a diamine and a dianhydride. 13.5 g of the compound of Formula 17 (m-phenylene diamne) and 70 g of NMP (N-methyl pyrrolidone) were charged into an RBF (3 neck round bottom flask) and dissolved by stirring at room temperature. The above solution was cooled with a water bath, and 26 g of the compound of Formula 18 below was divided into three times and slowly added thereto together with 60 g of NMP. When all the added compounds were dissolved, 26 g of toluene was added to the reactant for the azeotrope reaction. A Dean Stark unit and a reflux condenser were installed, and the Dean Stark unit was charged with toluene added. 5.2 mL of pyridine was added as a catalyst for dehydration and condensation, followed by raising the temperature to 170° C. and stirring for 3 hours. The reactant was further stirred for 2 hours while removing water generated as imide rings were formed, with the Dean Stark unit, and the residual toluene and pyridine were removed. The reaction product was cooled to room temperature, precipitated in deionized water and recovered. The recovered precipitate was subjected to soxhlet extraction with methanol to remove the residual reactant and dried in a vacuum oven to obtain the compound of Formula 19 in a yield of about 83% by weight. The NMR analysis results of the compound of Formula 19 are shown in FIG. 4.

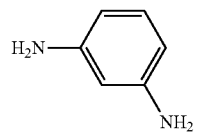

[Formula 17]

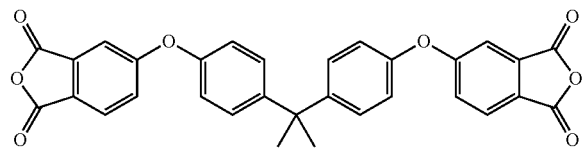

[Formula 18]

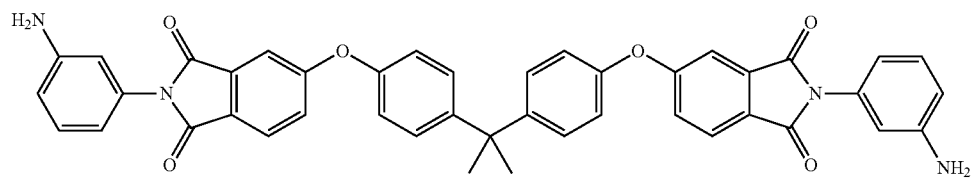

[Formula 19]

Production Example 5. Synthesis of Compound (CA5)

Figure 5:
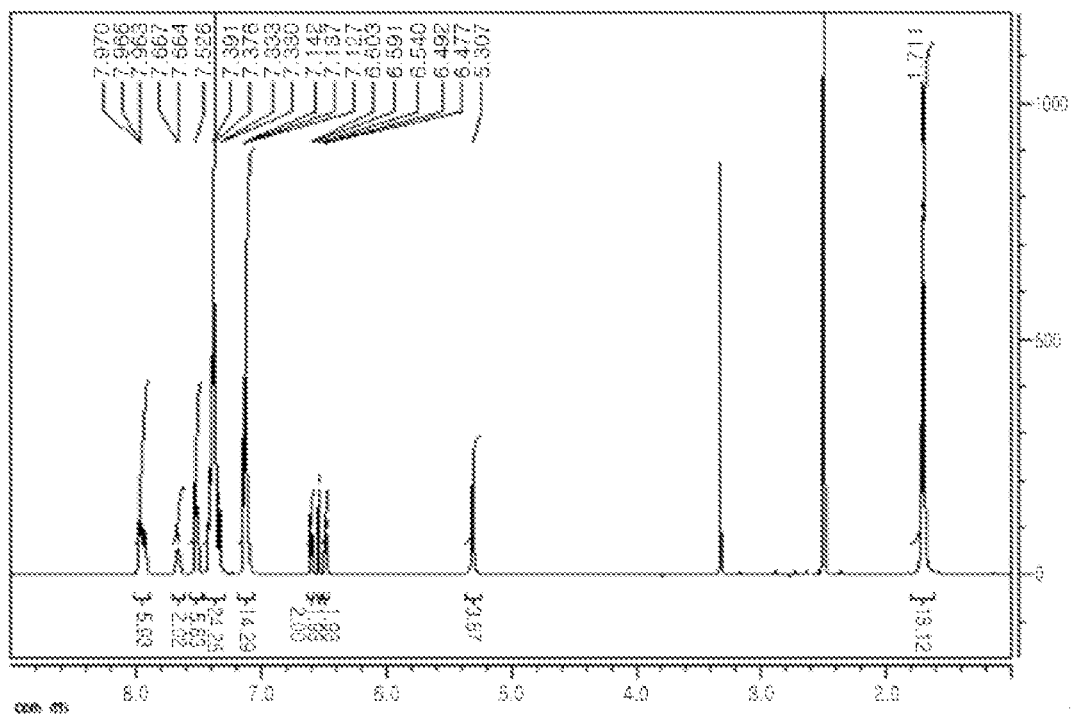

The compound of Formula 20 below was synthesized by dehydration and condensation of a diamine and a dianhydride. 8.1 g of the compound of Formula 17 (m-phenylene diamine) in Production Example 4 and 50 g of NMP (N-methyl pyrrolidone) were added to an RBF (3 neck round bottom flask) and dissolved by stirring at room temperature. The above solution was cooled with a water bath, and 26 g of the compound of Formula 18 in Production Example 4 was divided into three times and slowly added thereto together with 60 g of NMP. When all the added compounds were dissolved, 23 g of toluene was added to the reactant for the azeotrope reaction. A Dean Stark unit and a reflux condenser were installed, and the Dean Stark unit was charged with toluene added. 5.2 mL of pyridine was added as a catalyst for dehydration and condensation, followed by raising the temperature to 170° C. and stirring for 3 hours. The reactant was further stirred for 2 hours while removing water generated as imide rings were formed, with the Dean Stark unit, and the residual toluene and pyridine were removed. The reaction product was cooled to room temperature, precipitated in methanol and recovered. The recovered precipitate was subjected to soxhlet extraction with methanol to remove the residual reactant and dried in a vacuum oven to obtain the compound of Formula 20 in a yield of about 93% by weight. The NMR analysis results of the compound of Formula 20 are shown in FIG. 5.

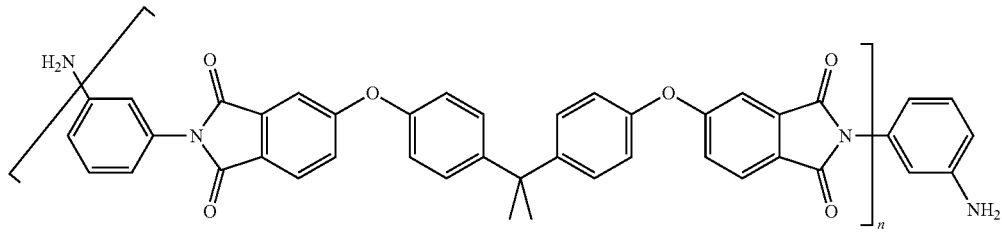

[Formula 20]

In Formula 20, n is about 3.

Production Example 6. Synthesis of Compound (CA6)

Figure 6:
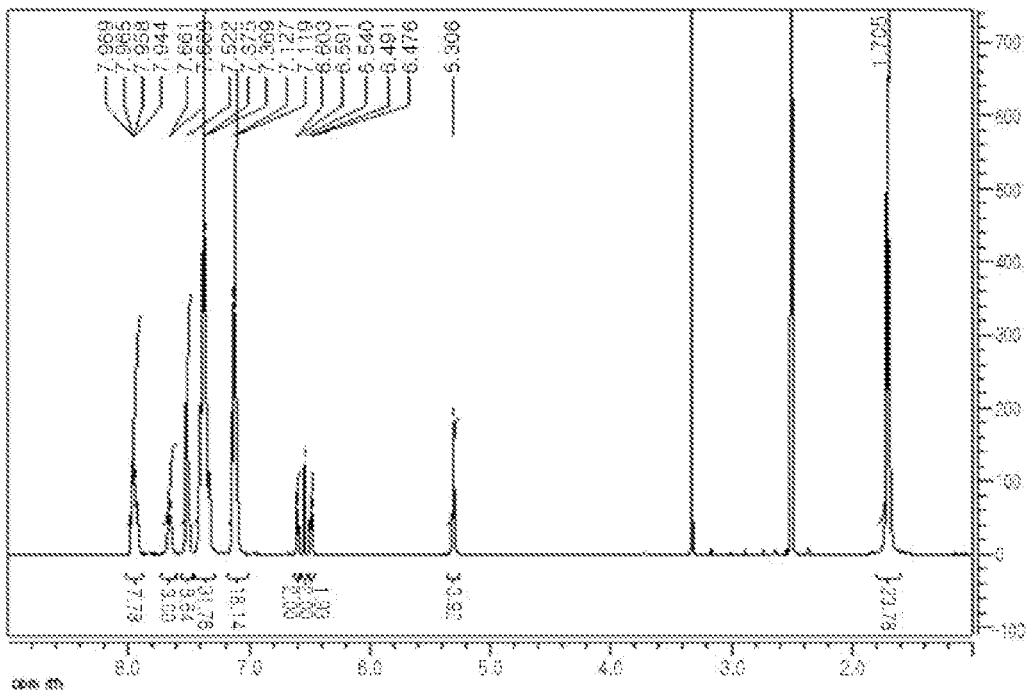

The compound of Formula 21 below was synthesized by dehydration and condensation of a diamine and a dianhydride. 6.5 g of the compound of Formula 17 (m-phenylene diamine) in Production Example 4 and 50 g of NMP (N-methyl pyrrolidone) were added to an RBF (3 neck round bottom flask) and dissolved by stirring at room temperature. The above solution was cooled with a water bath, and 23.4 g of the compound of Formula 18 in Production Example 4 was divided into three times and slowly added thereto together with 60 g of NMP. When all the added compounds were dissolved, 23 g of toluene was added to the reactant for the azeotrope reaction. A Dean Stark unit and a reflux condenser were installed, and the Dean Stark unit was charged with toluene added. 5.2 mL of pyridine was added as a catalyst for dehydration and condensation, followed by raising the temperature to 170° C. and stirring for 3 hours. The reactant was further stirred for 2 hours while removing water generated as imide rings were formed, with the Dean Stark unit, and the residual toluene and pyridine were removed. The reaction product was cooled to room temperature, precipitated in methanol and recovered. The recovered precipitate was subjected to soxhlet extraction with methanol to remove the residual reactant and dried in a vacuum oven to obtain the compound of Formula 21 in a yield of about 95% by weight. The NMR analysis results of the compound of Formula 21 are shown in FIG. 6.

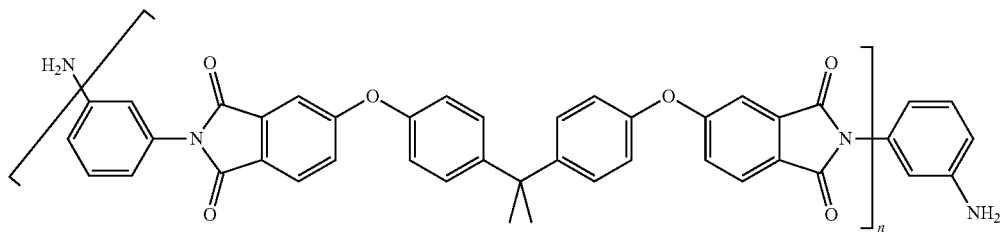

[Formula 21]

In Formula 21, n is about 4.

Production Example 7. Synthesis of Compound (CA7)

As the compound of Formula 22 below, a commercially available product from TCI (Tokyo Chemical Industry Co., Ltd.) was obtained and used without further purification.

[Formula 22]

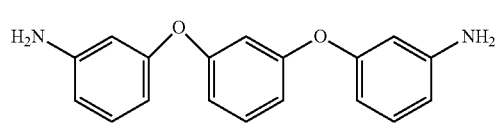

Production Example 8. Synthesis of Compound (PN1)

Figure 7:
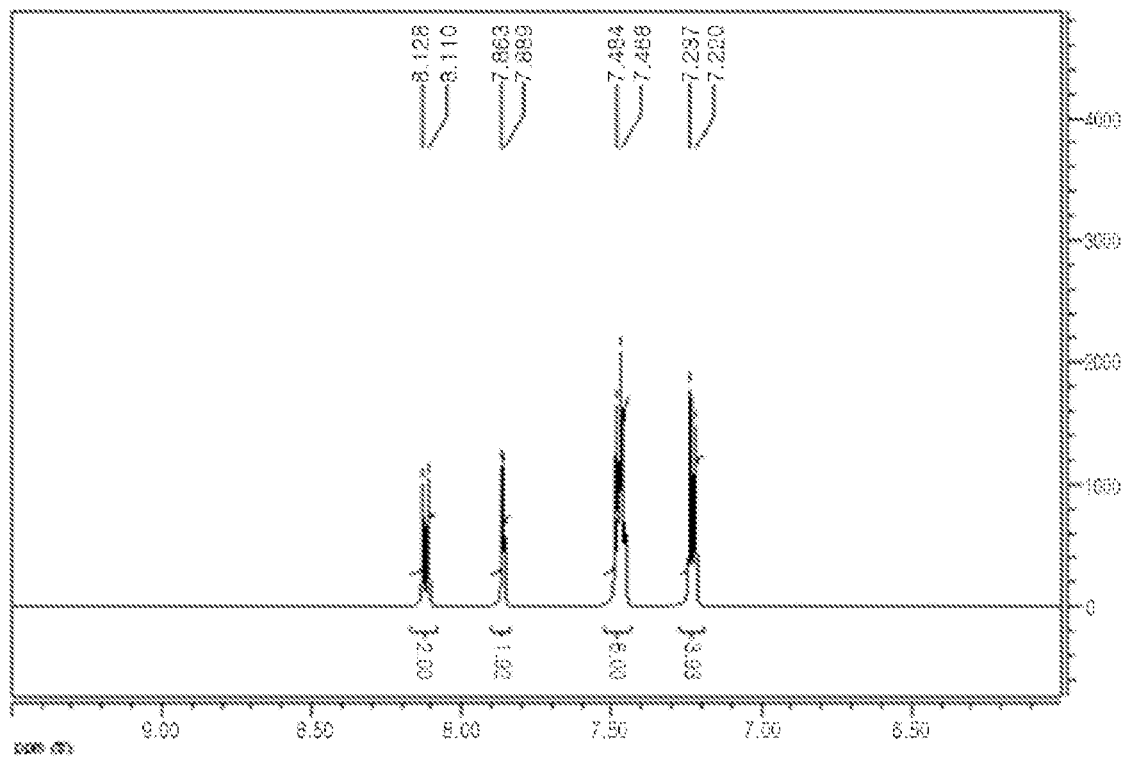

The compound of Formula 23 below was synthesized in the following manner. 32.7 g of the compound of Formula 25 below and 120 g of DMF (Dimethyl Formamide) were added to an RBF (3 neck round bottom flask) and dissolved by stirring at room temperature. Subsequently, 51.9 g of the compound of Formula 24 above was further added, and 50 g of DMF was added thereto, followed by dissolving with stirring. Subsequently, 62.2 g of potassium carbonate and 50 g of DMF were added together, and the temperature was raised to 85° C. with stirring. After reacting in the above state for about 5 hours, the reactant was cooled to room temperature. The cooled reaction solution was poured into a 0.2N hydrochloric acid aqueous solution, neutralized and precipitated, followed by filtering and then washing with water. The filtered reactant was then dried in a vacuum oven at 100° C. for 1 day, and after removal of water and the residual solvent, the compound of Formula 23 below was obtained in a yield of about 80% by weight. The NMR results for the compound of Formula 23 were shown in FIG. 7.

[Formula 23]

[Formula 24]

[Formula 25]

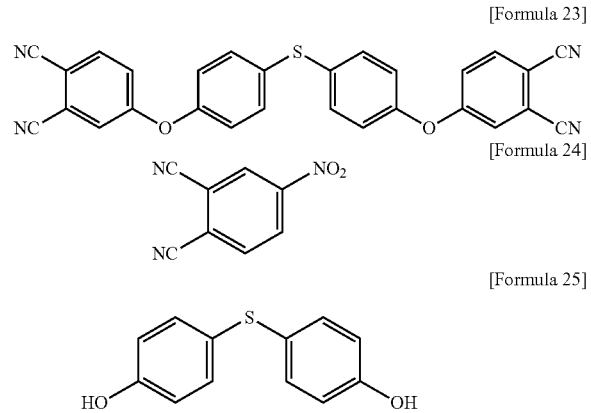

TGA analysis results for the compounds of Production Examples 1 to 7 were shown in Table 1 below. From Table 1, it can be confirmed that the compounds (CA1 to CA6) of Production Examples 1 to 6 represent heat resistance characteristics superior to the compound (CA7) of Production Example 7. While the compound of CA7 is fully decomposed near 300° C., the compounds of CA1 to CA6 have much higher decomposition temperatures (Td10%) than 300° C., and thus it can be confirmed that thermal decomposition will hardly occur even in high temperature calcination. In addition, the single molecules CA1 and CA4 have excellent heat resistance characteristics as compared to CA7, but the heat resistance characteristics are lower than those of CA2, CA3, CA5 and CA6, and thus it can be confirmed that even in the case of the same monomer, the heat resistance tends to increase as the molecular weight increases. In the following Table 1, the glass transition temperature (Tg) or melting temperature (Tm) confirmed through DSC analysis was described as the processing temperature. From the results shown in Table 1, it can be seen that the lower the molecular weight, the lower the processing temperature is confirmed. However, the increase in the processing temperature is low as compared with the increase in the molecular weight, and thus it can be predicted that even in the case of a material having a high molecular weight such as CA3 or CA6, the processing temperature is not high, the melt compatibility with the monomer is good, the curing efficiency is good, the process window is wide and the workability is good.

TABLE 1

| | Processing temperature (Tm or Tg) | Td10% | Residue at 800° C. | Td100% |
|---|---|---|---|---|
| Production Example1(CA1) | 147° C. | 390° C. | 41.9% | — |
| Production Example2(CA2) | 162.6° C. | 420° C. | 46.6% | — |
| Production Example3(CA3) | 171.5° C. | 428° C. | 46.0% | — |
| Production Example4(CA4) | 124° C. | 366° C. | 47.8% | — |
| Production Example5(CA5) | 176.2° C. | 513° C. | 53.9% | — |
| Production Example6(CA6) | 188.8° C. | 513° C. | 54.8% | — |
| Production Example7(CA7) | 108° C. | 264° C. | 0% | 331° C. |

Example 1

The compound (PN1) of Production Example 8 and the compound (CA2) of Production Example 2 were mixed for about 0.2 moles of the compound (CA2) of Production Example 2 per mole of the compound (PN1) of Production Example 8 to be present. Then, through the TGA analysis, a residue at 300° C. and a Td10% (a temperature at a weight loss of 10%) of the mixture were confirmed.

Example 2

The compound (PN1) of Production Example 8 and the compound (CA3) of Production Example 3 were mixed for about 0.2 moles of the compound (CA3) of Production Example 2 per mole of the compound (PN1) of Production Example 8 to be present. Then, through the TGA analysis, a residue at 300° C. and a Td10% (a temperature at a weight loss of 10%) of the mixture were confirmed.

Example 3

The compound (PN1) of Production Example 8 and the compound (CA5) of Production Example 5 were mixed for about 0.2 moles of the compound (CA5) of Production Example 5 per mole of the compound (PN1) of Production Example 8 to be present. Then, through the TGA analysis, a residue at 300° C. and a Td of 10% (a temperature at a weight loss of 10%) of the mixture were confirmed.

Example 4

The compound (PN1) of Production Example 8 and the compound (CA6) of Production Example 6 were mixed for about 0.2 moles of the compound (CA6) of Production Example 6 per mole of the compound (PN1) of Production Example 8 to be present. Then, through the TGA analysis, a residue at 300° C. and a Td10% (a temperature at a weight loss of 10%) of the mixture were confirmed.

Comparative Example 1

The compound (PN1) of Production Example 8 and the compound (CA1) of Production Example 1 were mixed for about 0.2 moles of the compound (CA1) per mole of the compound (PN1) of Production Example 8 to be present. Then, through the TGA analysis, a residue at 300° C. and a Td10% (a temperature at a weight loss of 10%) of the mixture were confirmed.

Comparative Example 2

The compound (PN1) of Production Example 8 and the compound (CA4) of Production Example 4 were mixed for about 0.2 moles of the compound (CA4) of Production Example 4 per mole of the compound (PN1) of Production Example 8 to be present. Then, through the TGA analysis, a residue at 300° C. and a Td10% (a temperature at a weight loss of 10%) of the mixture were confirmed.

Comparative Example 3

The compound (PN1) of Production Example 8 and the compound (CA7) of Production Example 7 were mixed for about 0.2 moles of the compound (CA7) of Production Example 7 per mole of the compound (PN1) of Production Example 8 to be present. Then, through the TGA analysis, a residue at 300° C. and a Td10% (a temperature at a weight loss of 10%) of the mixture were confirmed.

The analytical results of the compounds of the above Examples and Comparative Examples were summarized and described in Table 2 below.

TABLE 2

|  |  | Composition | Residue at 300° C. | Td10% |
|---|---|---|---|---|
| Example | 1 | PN1 + CA2 | 98.2% | 402° C. |
|  | 2 | PN1 + CA3 | 97.7% | 402° C. |
|  | 3 | PN1 + CA5 | 99.4% | 407.1° C. |
|  | 4 | PN1 + CA6 | 98.9% | 408.7° C. |
| Comparative | 1 | PN1 + CA1 | 97.7% | 390.6° C. |
| Example | 2 | PN1 + CA4 | 98.2% | 397.5° C. |
|  | 3 | PN1 + CA7 | 96.1% | 384.8° C. |

From the results of Table 2, since the thermal decomposition temperature is very low and thus the thermal stability is lowered in the case of using a general curing agent CA7, it can be confirmed, in the case of using this (Comparative Example 3), that a considerable amount of pyrolysis has already occurred at 300° C. and the temperature of Td10% is also the lowest point. It can be confirmed that when the same monomer is applied, the case where the compounds of CA2, CA3, CA5 and CA6 are applied (Examples 1 to 4) has more excellent thermal stability as compared with the case where the compound of CA1 or CA4 is applied (Comparative Examples 1 and 2). From these results, it can be confirmed that when the compounds of the present application are applied, excellent heat stability is ensured to prevent out gassing in high temperature processes, whereby voids or defects may be minimized during processing.

The invention claimed is:

1. A polymerizable composition for forming a phthalonitrile resin through a polymerization, the polymerizable composition comprising:
   a phthalonitrile compound; and
   a curing agent for the phthalonitrile compound, wherein the curing agent comprises a compound represented by Formula 1:

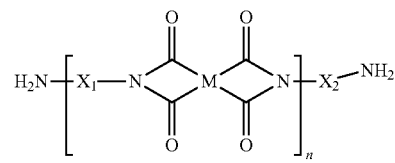

[Formula 1]

wherein in Formula 1, M is a tetravalent radical derived from a structure represented by Formula 4, wherein four hydrogens of the structure are each replaced with a bond linked with carbon atoms of carbonyl groups in Formula 1:

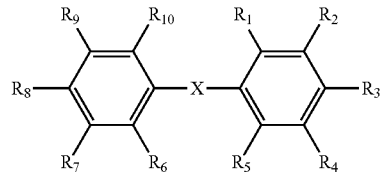

[Formula 4]

wherein in Formula 4, $R_1$ to $R_{10}$ are each independently hydrogen, an alkyl group, an alkoxy group or an aryl group, X is -S(=O)—, —C(=O)—O-$L_1$-O—C(=O)—, -$L_2$-C(=O)—O-$L_3$- or -$L_4$-O—C(=O)-$L_5$-, where $L_1$ is an alkylene group or an alkylidene group, $L_2$ and $L_5$ are each independently a single bond, oxygen, an alkylene group or an alkylidene group, and $L_3$ and $L_4$ are each independently a single bond, an alkylene group or an alkylidene group;
$X_1$ and $X_2$ are each independently an alkylene group, an alkylidene group or an aromatic divalent radical represented by any one of Formulas 8 or 9:

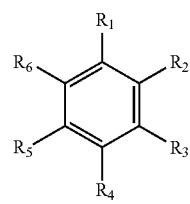

[Formula 8]

wherein in Formula 8, $R_1$ is replaced with a bond linked with the nitrogen linked with the carbonyl group in the Formula 1, one of $R_2$, $R_4$ or $R_6$ is replaced with a bond linked with the amino group of the Formula 1, and the others of $R_2$, $R_4$ or $R_6$, and $R_3$ and $R_5$ are each independently hydrogen, an alkyl group, an alkoxy group, an aryl group, a hydroxy group or a carboxyl group;

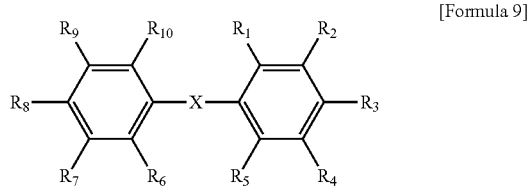

[Formula 9]

wherein in Formula 9:

when $R_3$ is replaced with a bond linked with the nitrogen linked with the carbonyl group in the Formula 1, $R_1$, $R_2$ and $R_4$ to $R_{10}$ are each independently hydrogen, an alkyl group, an alkoxy group, a hydroxy group, a carboxyl group or an aryl group, and X is a single bond, an alkylene group, an alkylidene group, an oxygen atom, a sulfur atom, a carbonyl group, $-NR_{11}-$, $-S(=O)-$, $-S(=O)_2-$, $-L_9-Ar_3-L_{10}-$ or $-L_9-Ar_3-L_{10}-Ar_4-L_{11}-$, where $R_{11}$ is hydrogen, an alkyl group, an alkoxy group or an aryl group, $Ar_3$ and $Ar_4$ are each independently an arylene group, and $L_9$ to $L_{11}$ are each independently a single bond, an oxygen atom, an alkylene group or an alkylidene group, with the proviso that one of $R_1$, $R_2$, $R_4$, $R_5$, $R_6$, $R_8$ or $R_{10}$ is replaced with a bond linked with the amino group in the Formula 1;

when one of $R_2$ or $R_4$ is replaced with a bond linked with the nitrogen linked with the carbonyl group in the Formula 1, the other of $R_2$ or $R_4$, and $R_1$, $R_3$ and $R_5$ to $R_{10}$ are each independently hydrogen, an alkyl group, an alkoxy group, a hydroxy group, a carboxyl group or an aryl group, and X is a single bond, an alkylene group, an alkylidene group, an oxygen atom, a sulfur atom, a carbonyl group, $-NR_{11}-$, $-S(=O)-$, $-S(=O)_2-$, $-L_9-Ar_3-L_{10}-$ or $-L_9-Ar_3-L_{10}-Ar_4-L_{11}-$, where $R_{11}$ is hydrogen, an alkyl group, an alkoxy group or an aryl group, $Ar_3$ and $Ar_4$ are each independently an arylene group, and $L_9$ to $L_{11}$ are each independently a single bond, an oxygen atom, an alkylene group or an alkylidene group, with the proviso that one of $R_1$, $R_3$, $R_5$, $R_6$ or $R_{10}$ is replaced with a bond linked with the amino group in the Formula 1; and when one of $R_1$ and $R_5$ is replaced with a bond linked with the nitrogen linked with the carbonyl group in the Formula 1, the other of $R_1$ or $R_5$, and $R_2$ to $R_4$ and $R_6$ to $R_{10}$ are each independently hydrogen, an alkyl group, an alkoxy group, a hydroxy group, a carboxyl group or an aryl group, and X is a single bond, an alkylene group, an alkylidene group, an oxygen atom, a sulfur atom, a carbonyl group, $-NR_{11}-$, $-S(=O)-$, $-S(=O)_2-$, $-L_9-Ar_3-L_{10}-$ or $-L_9-Ar_3-L_{10}-Ar_4-L_{11}-$, where $R_{11}$ is hydrogen, an alkyl group, an alkoxy group or an aryl group, $Ar_3$ and $Ar_4$ are each independently an arylene group, and $L_9$ to $L_{11}$ are each independently a single bond, an oxygen atom, an alkylene group or an alkylidene group, with the proviso that one of $R_2$ to $R_4$ or $R_6$ to $R_{10}$ is replaced with the amino group in the Formula 1 and n is a number of 2 or more.

2. The polymerizable composition of claim 1, wherein n is a number in a range of 2 to 200.

3. The polymerizable composition according to claim 1, wherein the compound represented by Formula 1 has a decomposition temperature of 400° C. or higher.

4. The polymerizable composition according to claim 1, wherein the composition is processable at a temperature in a range of 150° C. to 350° C.

5. The polymerizable composition according to claim 1, further comprising a filler.

6. The polymerizable composition according to claim 1, wherein the compound represented by Formula 1 is contained in an amount of about 0.02 moles to about 1.5 moles per mole of the phthalonitrile compound.

7. A prepolymer which is formed by a reaction of the polymerizable composition of claim 1.

8. The prepolymer according to claim 7, wherein the prepolymer is processable to a temperature (Tp) in a range of 150° C. to 350° C.

9. A phthalonitrile resin which is a polymer formed by polymerizing the polymerizable composition of claim 1.

10. A composite comprising the phthalonitrile resin of claim 9 and a filler.

11. The composite according to claim 10, wherein the filler is a metal material, a ceramic material, glass, a metal oxide, a metal nitride or a carbon-based material.

12. A process for preparing a composite comprising a step of curing the polymerizable composition of claim 1.

13. A process for preparing a composite comprising a step of curing the prepolymer of claim 7.

* * * * *